(12) United States Patent
Eiselt et al.

(10) Patent No.: US 9,467,316 B2
(45) Date of Patent: Oct. 11, 2016

(54) METHOD AND DEVICE FOR TRANSMITTING A LOW-FREQUENCY SIGNAL OVER A DATA TRANSMISSION LINK USING A DIGITAL HIGH BIT-RATE SIGNAL

(75) Inventors: Michael Eiselt, Kirchheim (DE); Mirko Lawin, Meiningen (DE)

(73) Assignee: Adva Optical Networking SE, Meiningen (DE)

( * ) Notice: Subject to any disclaimer, the term of this patent is extended or adjusted under 35 U.S.C. 154(b) by 831 days.

(21) Appl. No.: 13/471,748

(22) Filed: May 15, 2012

(65) Prior Publication Data

US 2013/0188967 A1 Jul. 25, 2013

(30) Foreign Application Priority Data

Jan. 20, 2012 (EP) .................................. 12401006

(51) Int. Cl.
| | | |
|---|---|---|
| H04B 10/04 | (2006.01) | |
| H04L 27/02 | (2006.01) | |
| H04L 25/49 | (2006.01) | |
| H04B 10/50 | (2013.01) | |

(52) U.S. Cl.
CPC ............. *H04L 27/02* (2013.01); *H04B 10/505* (2013.01); *H04L 25/4906* (2013.01); *H04L 25/4908* (2013.01)

(58) Field of Classification Search
CPC .......... H04B 10/505; H04B 10/50575; H04B 10/50595; H04B 10/5162; H04B 10/077; H04B 10/07955; H04B 10/1127; H04B 10/50572; H04B 10/504; H04L 25/4906; H04L 25/4908; H04L 27/02; H04L 5/0091; G06K 15/1209; H04J 3/1694
USPC ....... 398/140, 182, 183, 186, 187, 189, 190; 375/268, 300
See application file for complete search history.

(56) References Cited

U.S. PATENT DOCUMENTS

| | | | | | |
|---|---|---|---|---|---|
| 5,510,919 | A * | 4/1996 | Wedding | ................ | H04B 10/50 375/287 |
| 7,158,723 | B2 * | 1/2007 | Wan | ..................... | H04B 10/505 398/183 |
| 7,603,042 | B2 * | 10/2009 | Eiselt | ................... | H04B 10/695 398/202 |
| 7,965,140 | B2 * | 6/2011 | Takahashi | ............. | H03F 1/0211 330/10 |
| 8,121,475 | B2 * | 2/2012 | Kagawa | ........... | H04B 10/07953 356/218 |
| 8,406,630 | B2 * | 3/2013 | Hinderthur | ......... | H04J 14/0227 370/241 |

(Continued)

FOREIGN PATENT DOCUMENTS

| | | |
|---|---|---|
| JP | 01320599 A | 12/1989 |
| WO | 9106161 A1 | 5/1991 |

*Primary Examiner* — Hibret Woldekidan
(74) *Attorney, Agent, or Firm* — The Webb Law Firm

(57) ABSTRACT

Disclosed is a method for transmitting a low-frequency signal over a data transmission link using a digital high bit-rate signal including the steps of creating a modulated digital high bit-rate signal the average power of which varies according to the low-frequency signal, supplying the modulated digital high bit-rate signal to a first end of the data transmission link, receiving the modulated digital high bit-rate signal at a second end of the data transmission link or at an intermediate node of the data transmission link, and detecting the low-frequency signal by low-pass filtering the received modulated digital high bit-rate signal. According to the invention, the variation of the average power of the modulated digital high bit-rate signal is effected by a variation of the density of "high" bits according to the low-frequency signal.

16 Claims, 5 Drawing Sheets

(56) References Cited

U.S. PATENT DOCUMENTS

Figure 1:
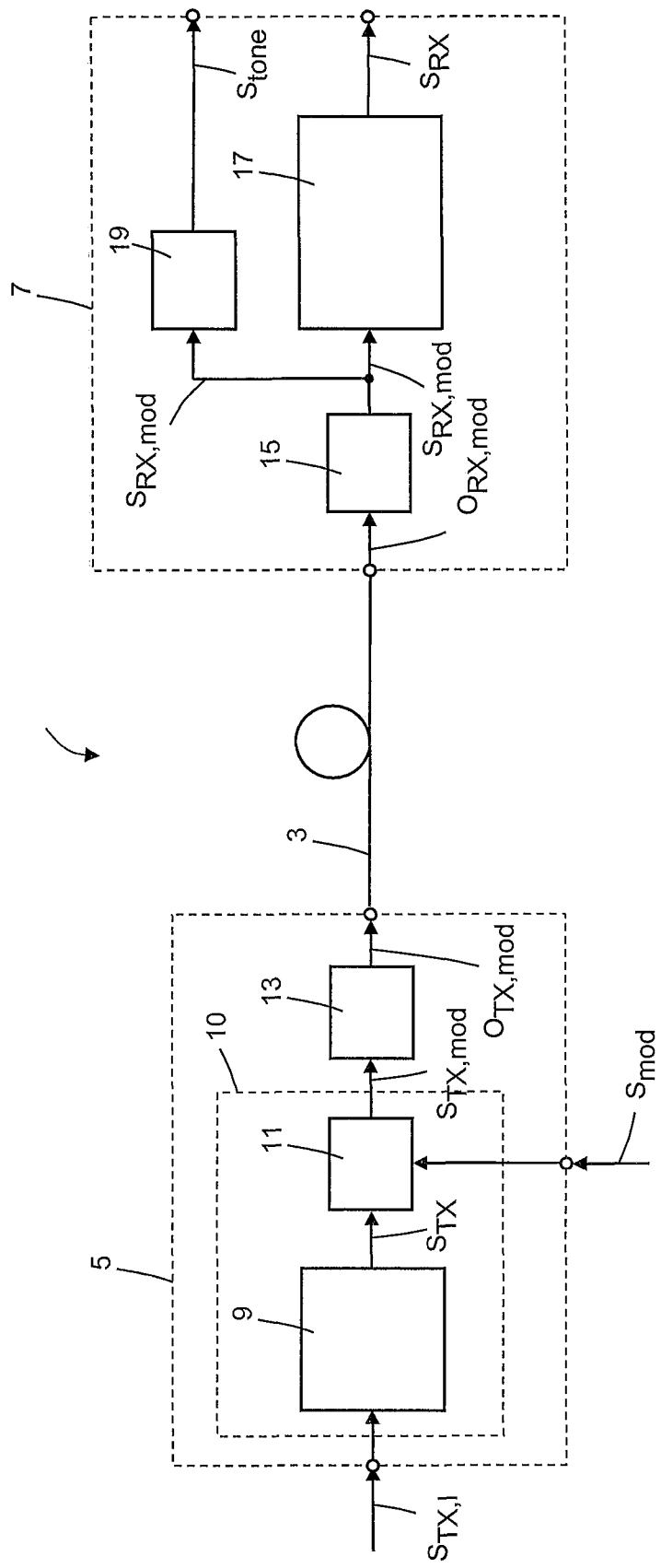

| | | | | |
|---|---|---|---|---|
| 8,494,372 B2* | 7/2013 | Eiselt | H04B 10/675 | 398/140 |
| 8,670,673 B2* | 3/2014 | Eiselt | G01M 11/3172 | 398/169 |
| 8,879,921 B2* | 11/2014 | Eiselt | H04B 10/07953 | 359/276 |
| 2002/0186440 A1* | 12/2002 | Adachi | H03F 3/24 | 398/183 |
| 2003/0035183 A1* | 2/2003 | Seto | H04B 10/504 | 398/141 |
| 2003/0067651 A1* | 4/2003 | Wan | H04B 10/504 | 398/91 |
| 2007/0230970 A1* | 10/2007 | Asano | H04B 10/504 | 398/187 |
| 2009/0016712 A1* | 1/2009 | Kagawa | H04B 10/07953 | 398/9 |
| 2010/0021159 A1* | 1/2010 | Chiu | H04B 10/2972 | 398/43 |
| 2010/0290785 A1* | 11/2010 | Hinderthur | H04J 14/0227 | 398/79 |
| 2011/0110659 A1* | 5/2011 | Eiselt | H04B 10/071 | 398/28 |
| 2011/0305461 A1* | 12/2011 | Eiselt | H04B 10/07953 | 398/152 |
| 2013/0064542 A1* | 3/2013 | Eiselt | H01S 5/0687 | 398/34 |

* cited by examiner

| Random data | Encoding "low" | Flag bit | Number of "ones" | Encoding "high" | Flag bit | Number of "ones" |
|---|---|---|---|---|---|---|
| 0000 | 0000 | 0 | 0 | 1111 | 1 | 5 |
| 0001 | 0001 | 0 | 1 | 1110 | 1 | 4 |
| 0010 | 0010 | 0 | 1 | 1101 | 1 | 4 |
| 0011 | 0011 | 0 | 2 | 1100 | 1 | 3 |
| 0100 | 0100 | 0 | 1 | 1011 | 1 | 4 |
| 0101 | 0101 | 0 | 2 | 1010 | 1 | 3 |
| 0110 | 0110 | 0 | 2 | 1001 | 1 | 3 |
| 0111 | 1000 | 1 | 2 | 0111 | 0 | 3 |
| 1000 | 1000 | 0 | 1 | 0111 | 1 | 4 |
| 1001 | 1001 | 0 | 2 | 0110 | 1 | 3 |
| 1010 | 1010 | 0 | 2 | 0101 | 1 | 3 |
| 1011 | 0100 | 1 | 2 | 1011 | 0 | 3 |
| 1100 | 1100 | 0 | 2 | 0011 | 1 | 3 |
| 1101 | 0010 | 1 | 2 | 1101 | 0 | 3 |
| 1110 | 0001 | 1 | 2 | 1110 | 0 | 3 |
| 1111 | 0000 | 1 | 1 | 1111 | 0 | 4 |

Fig. 5

METHOD AND DEVICE FOR TRANSMITTING A LOW-FREQUENCY SIGNAL OVER A DATA TRANSMISSION LINK USING A DIGITAL HIGH BIT-RATE SIGNAL

BACKGROUND OF THE INVENTION

1. Field of the Invention

The invention relates to a method for transmitting a low-frequency signal over a data transmission link using a digital high bit-rate signal and to a transmitting device, as well as to a receiving device.

2. Description of Related Art

Especially in optical access point-to-point optical transmission systems, control data are transported in an optical overhead channel. An advantageous possibility of transmitting the overhead channel over the respective transmission link is to use the wanted high bit-rate digital signal of the data carrying channel as a carrier for a low-frequency signal (also designated as "tone") including the control data. The tone is generated by amplitude (average power) modulation of the optical carrier signal using a small modulation index of typically less than 10 percent. The overhead channel information, that is the control data, is encoded in the amplitude or the phase of the tone.

In order to modulate the wanted high bit-rate digital signal according to the low-frequency signal (or tone), it is known to modulate the power of the optical carrier by modulating the bias current of the laser diode of the optical transmitting unit. However, this requires additional control hardware, which is not available in standard transmitter or transceiver modules. Alternatively, the tone can be impressed on the optical wanted high bit-rate digital signal by external modulation of the optical power. This requires a separate and costly external modulator, for example an electro-absorption modulator or a mechanical variable optical modulator.

It is thus an object of the present invention to provide a method for transmitting a low-frequency signal over a data transmission link using a digital high bit-rate signal that can be realized without additional hardware using the hardware of conventional transmitting and receiving (or transceiver) devices. It is a further object of the invention to provide a transmitting device and a receiving device suitable to implement this method.

SUMMARY OF THE INVENTION

The present invention is based on the finding that a variation of the average power of the modulated high bit-rate digital signal can be effected by a variation of the density of "high" bits according to a characteristic value of or an information included in the low-frequency signal. Especially, the variation of the average power of the modulated high bit-rate digital signal may be effected according to the amplitude of the low-frequency signal.

It is of course possible to use the information (e.g. of one or more digital signals) to be included within the bits of the modulated high bit-rate digital signal (i.e. the information to be detectable from a modulated high bit-rate digital signal received by digitally decoding the signal received) and simultaneously use the information of the low-frequency signal to be included within the average power of the modulated high bit-rate digital signal in order to directly create the modulated high bit-rate digital signal.

Instead of using a desired information to be included (encoded) within the bits of the modulated high bit-rate digital signal, the high bit-rate stream may be created to include information in the variation of the average signal power, only. That is, no wanted signal information is included in the bit stream that can be detected by decoding the bit stream of the high bit-rate digital signal.

Further, it is possible to modify an existing high bit-rate digital signal whether or not the respective bit stream includes a wanted signal information (encoded in the bits) such that an additional information according to a low-frequency signal is imprinted onto the high bit-rate digital signal by modifying the density distribution of ones ("high" bits) and zeros ("low" bits) in the bit stream of the high bit-rate digital signal according to the low-frequency signal in order to include the desired information of the low-frequency signal within average power variations of the modified signal.

In order to detect (demodulate) the information included within the average power variations, the modulated high bit-rate digital signal may be received at the end of the transmission link or at an intermediate node of the transmission link. Detecting this information can be done completely separately from detecting (decoding) the information included in the high bit-rate bit stream by simply low-pass filtering the bit stream.

At this point, it should be mentioned that the term "average power" of the high bit-rate digital signal means a sliding average of the signal power determined for a predetermined (sliding) time span that largely exceeds the bit duration, or a given equivalent (high) number of bits.

Of course, the method may be realized for both electrical and optical data transmission links using either an electrical modulated high bit-rate digital signal or an optical modulated high bit-rate signal. The modulation is, of course, preferably effected at the electrical side, even if an optical modulated high bit-rate digital signal is to be created.

According to a further embodiment of the invention, digital data are encoded or scrambled to yield a high bit-rate digital signal with an essentially constant average power. Such a signal may easily be used in order to shift the density of "high" bits either to a higher or lower value corresponding to the (instantaneous) value of the low-frequency signal in order to achieve a modulation of the average power of the high bit-rate digital signal.

The density variation of "high" and "low" bits may be effected by inserting, according to a predetermined pattern, additional "high" bits and/or "low" bits into the digital high bit-rate signal in order to increase or decrease its average power, preferably by wrapping the data of the digital high bit-rate signal into outer frames, in which the additional "high" bits and/or "low" bits are added. However, this would mean to add (further) overhead to the high bit-rate digital signal, and thus additional bandwidth must be provided for transmitting the modulated signal.

According to a preferable embodiment of the invention, the density variation of "high" bits within the digital high bit-rate signal is effected by applying a varying encoding rule for directly creating the modulated high bit-rate digital signal or by applying a varying modulating encoding rule to a high bit-rate digital signal. The varying encoding rule or varying modulating encoding rule may be selected so as to add a minimum overhead necessary to effect the modulation of the high bit-rate digital signal.

The encoding rule or the modulating encoding rule may use an nB/mB encoding method which maps digital (source) words having n bits to digital (target) words having m bits, wherein m and n are integer numbers with m being greater than n, and wherein the m-bit words are chosen such that the density of "high" bits of the concatenated m-bit words, which form the modulated digital high bit-rate signal, yields an average power of the modulated high bit-rate digital signal corresponding to the low-frequency signal. As specific nB/mB encoding the widely used 8B/10B encoding may be applied. Especially, switching between the RD+ and RD− table of this code may be used in order to increase or decrease the density of "high" bits in the modulated high bit-rate digital signal.

According to a further embodiment of the invention, an existing digital high bit-rate signal may further be encoded by dividing the signal into concatenated p-bit words and by inverting the single bits of the p-bit word if the number of "low" bits is higher, or equal to or higher than the number of "high" bits, only, and by adding an overhead bit to the p-bit words so as to form a modulated digital high bit-rate signal consisting of concatenated (p+1)-bit words revealing, as compared to the original high bit-rate digital signal and corresponding to the low-frequency signal, an increased average power, and by setting the overhead bit in the (p+1)-bit words to "low" if no inversion was effected and to "high" if inversion was effected.

Alternatively, the further encoding may be effected by inverting the single bits of the p-bit word if the number of "high" bits is higher, or equal to or higher than the number of "low" bits, only, and by adding an overhead bit to the p-bit words so as to form a modulated digital high bit-rate signal consisting of concatenated (p+1)-bit words revealing, as compared to the original high bit-rate digital signal and corresponding to the low-frequency signal, a decreased average power and by setting the overhead bit in the (p+1)-bit words to "low" if inversion was effected and to "high" if no inversion was effected.

In principle, the two afore-mentioned alternatives may also be combined in order to achieve a higher modulation depth. For this, encoding may be effected by either inverting the single bits of the p-bit word if the number of "low" bits is equal to or higher than the number of "high" bits and if, according to the low-frequency signal, an increased density of "high" bits is requested (increasing inversion), and inverting the single bits of the p-bit word if the number of "high" bits is higher than the number of "low" bits and if, according to the low-frequency signal, a decreased density of "high" bits is requested (decreasing inversion), and by adding an overhead bit to the p-bit words so as to form a modulated digital high bit-rate signal consisting of concatenated (p+1)-bit words revealing, as compared to the original high bit-rate digital signal and corresponding to the low-frequency signal, an increased or decreased average power, and by setting the overhead bit in the (p+1)-bit words to "high" if an increasing or decreasing inversion was effected and to "low" if no inversion was effected.

In general, the varying encoding rule or the varying modulating encoding rule may comprise two states between which switching is effected in order to modulate the high bit-rate digital signal. In the first alternative described above, a first one of the two states may define the maximum increase and a second one of the two states may define the minimum increase of the density of "high" bits within the modulated digital high bit-rate signal as compared to the original digital high bit-rate signal. Accordingly, in the second alternative described above, a first one of the two states may define the maximum decrease and a second one of the two states may define the minimum decrease of the density of "high" bits within the modulated digital high bit-rate signal as compared to the original digital high bit-rate signal. In the embodiment combining the two alternatives, a first one of the two states may define the maximum increase and a second one of the two states may define the maximum decrease of the density of "high" bits within the modulated digital high bit-rate signal as compared to the original digital high bit-rate signal. In all cases, the first state may be assigned to the maximum value and the second state may be assigned to the minimum value of the low-frequency signal.

In this embodiment, intermediate values of the low-frequency signal may be realized in the modulated digital high bit-rate signal by switching between the first and second state in order to generate an average density of "high" bits corresponding to the respective instantaneous intermediate value. That is, in order to realize an intermediate value, switching must be effected at least once (of course multiple switching is also possible) within the time span used for determining the sliding average of the power of the modulated high bit-rate digital signal, which corresponds to the cut-off frequency of the low-pass filter that may be used for extracting the low-frequency signal from the modulated high bit-rate digital signal at the receiving end of the transmission link.

This modulation method may easily be implemented in a transmitting device as the modulation unit may be realized as part of a data processing unit being adapted to encode the high bit-rate digital signal so as to effect a density variation of "high" bits within the high bit-rate digital signal according to the low-frequency signal resulting in a modulation of the average power of the high bit-rate digital signal. Especially, the method may be implemented by means of a specific software or firmware comprised by the data processing unit. Thus, no additional hardware is necessary. Moreover, the bias point of the optical transmitter unit or element, which in most cases is a laser module or laser diode, can be kept constant.

As already mentioned, the modulation is preferably effected on the electrical side, even if the transmission link is an optical transmission link and the (electrical) modulated high bit-rate digital signal is converted into an optical signal.

A receiving device suitable to realize the method according to the invention may comprise a low-pass filter for low-pass filtering the received modulated high bit-rate digital signal. The low-pass filter reveals a cut-off frequency higher than the highest frequency component of the low-frequency signal to be detected.

Of course, the signal processing unit of the receiving device will generally also be able to process (especially to decode) the received modulated high bit-rate digital signal. However, the modulated high bit-rate digital signal may also be received at an intermediate node of the transmission link in which no detection or decoding of the high bit-rate component of the signal is effected and the low-frequency component included in the variation of the average power of the signal is detected, only.

BRIEF DESCRIPTION OF THE DRAWING(S)

Figure 2:
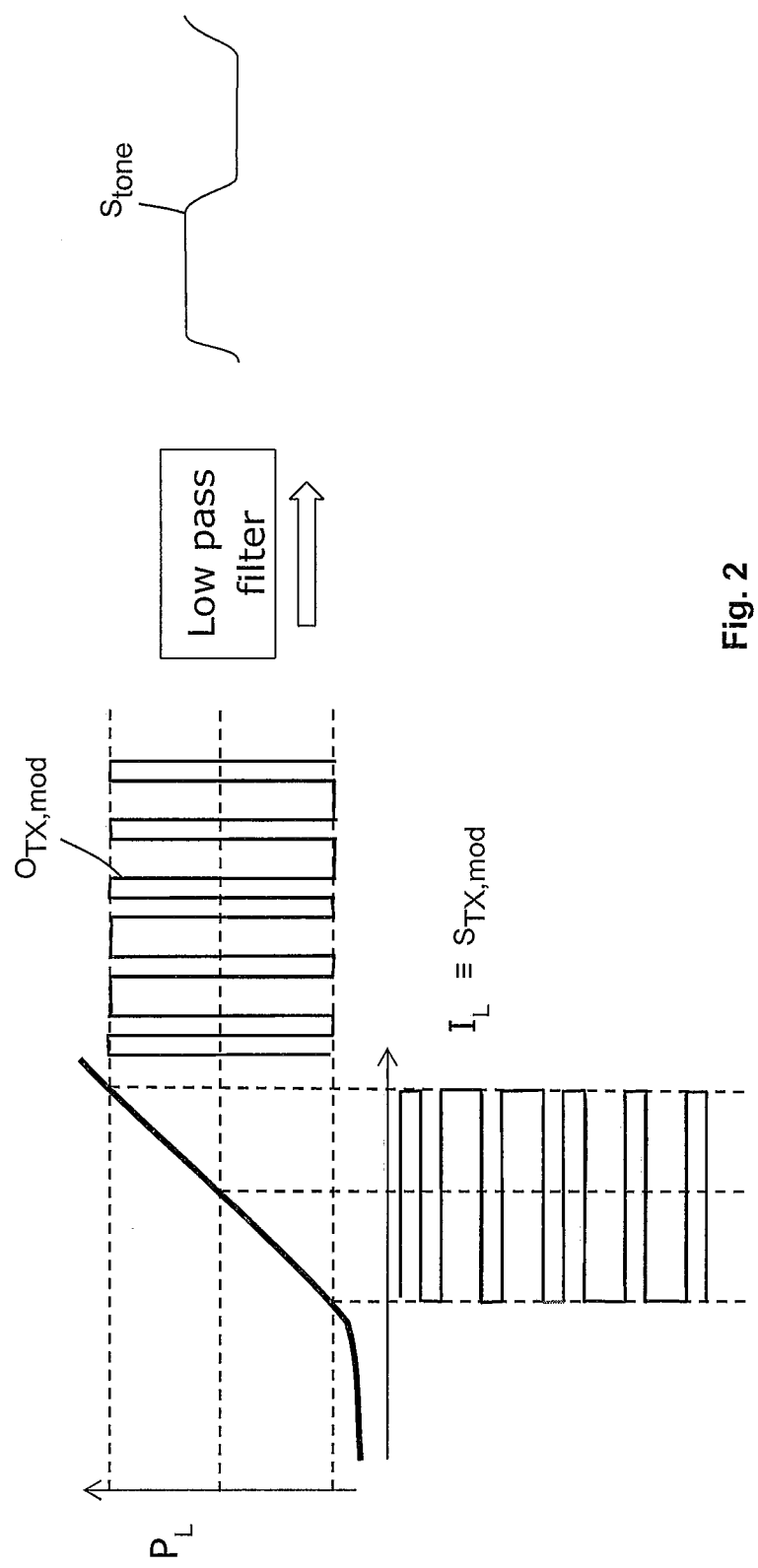
Figure 3:
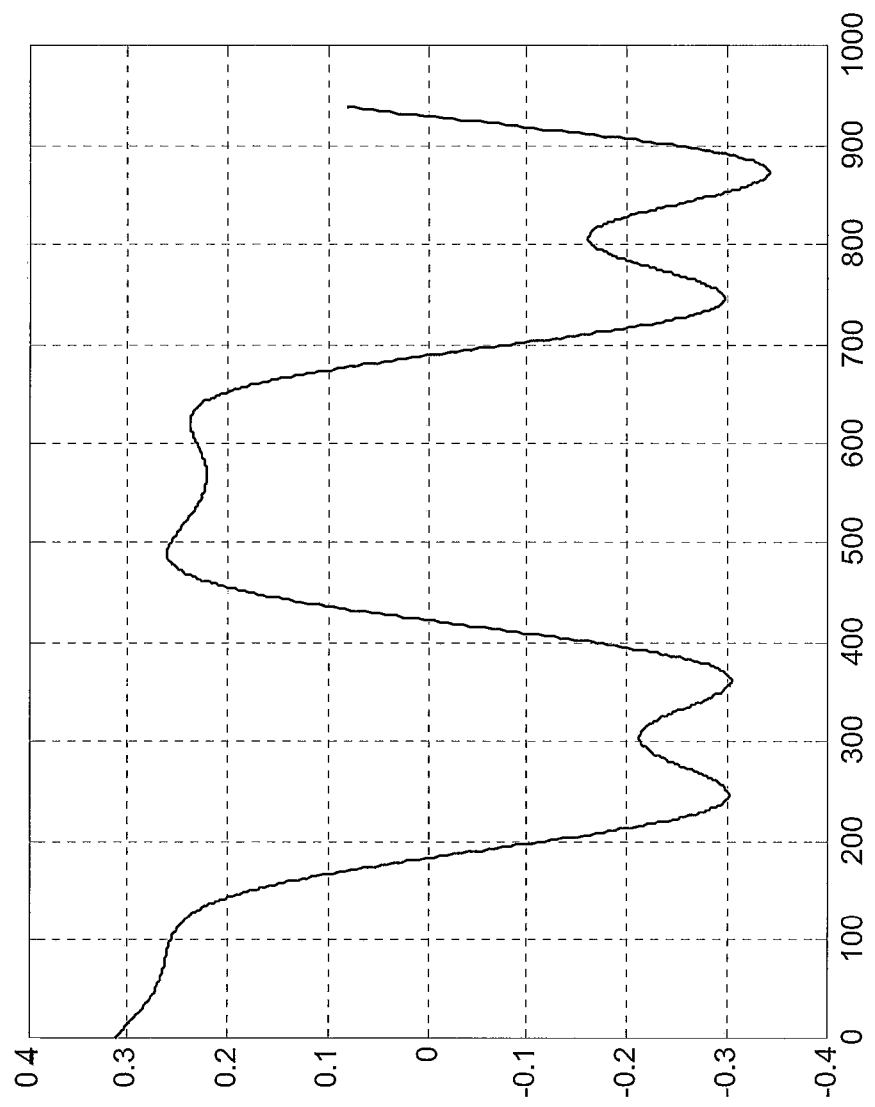
Figure 4:
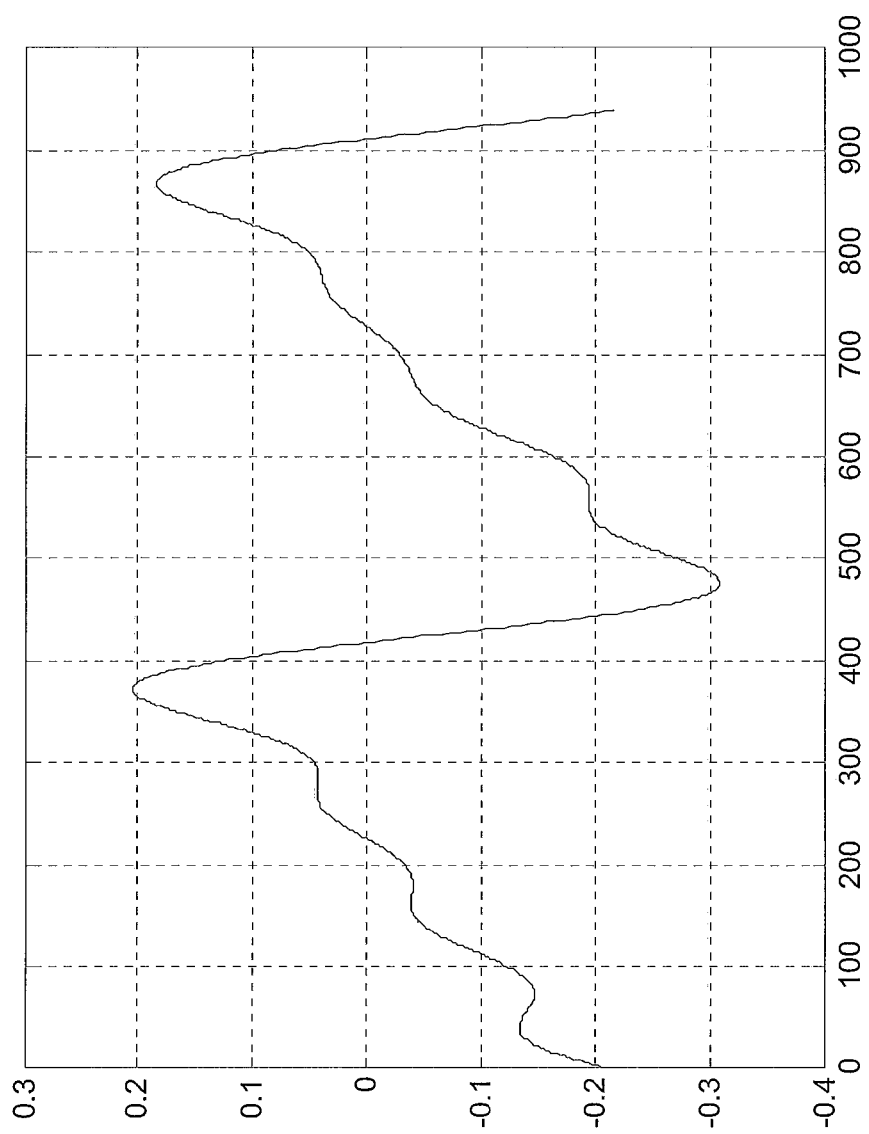

In the following, preferred embodiments of the invention will be described with reference to the drawing. In the drawing, the Figures show:

FIG. 1 a schematic block diagram of a fiber-optic point-to-point transmission link including a transmitting device and a receiving device according to the present invention;

FIG. 2 a schematic representation of the $P_L/I_L$ (power versus driving current) characteristic of a laser diode receiving a density modulated electrical high bit-rate digital signal to be converted into a corresponding optical signal and the low-frequency modulation signal being extracted from the modulated signal be simple low-pass filtering;

FIG. 3 a diagram of a simulated example for a low-pass filtered density modulated high bit-rate digital signal that was modulated using an 8B/10B code and a rectangular low-frequency signal modulation signal;

FIG. 4 a diagram of a simulated example for a low-pass filtered density modulated high bit-rate digital signal that was modulated using an 8B/10B code and a sawtooth low-frequency signal modulation signal; and FIG. 5 a coding table for a 4 bit inversion type code that may be used in a further embodiment of the density modulation or transmission method according to the present invention.

DESCRIPTION OF THE PREFERRED EMBODIMENT(S)

The schematic block diagram shown in FIG. 1 comprises a fiber-optic point-to-point transmission link 1 symbolized as a simple fiber-optic waveguide 3 and a transmitting device 5 connected to one end of the waveguide 3 as well as a receiving device 7 connected to the other end of the waveguide 3. Of course, the transmission link 1 may comprise other elements such as fiber-optic amplifiers, routers, transceivers (e.g. for signal recovery and/or changing the optical carrier wavelength of the signal etc.). Generally, a transmitting device and a receiving device will be present at both ends of the transmission link 1 in order to enable bi-directional communication, which are usually combined to form a transceiving device. However, for simplicity's sake, FIG. 1 shows a transmitting device 5 at one end and a receiving device 7 at the other end of the transmission link 1, only, so that a uni-directional communication is enabled between the transmitting device 5 and the receiving device 7.

The transmitting device 5 receives at least one local digital signal $S_{TX,I}$ to be sent over the transmission link 3 and comprises a data processing and modulation unit 10 adapted to receive the digital signal $S_{TX,I}$, which may be an electrical signal or an optical signal. In the latter case, the data processing and modulation unit 10 includes an optical-to-electrical converter means (not shown). The at least one local signal $S_{TX,I}$ is processed by a data processing unit 9 of the data processing and modulation unit 10 so as to form a high bit-rate digital signal $S_{TX}$.

Of course, a high bit-rate digital signal may directly be supplied to the transmitting device 5 as a single local digital signal $S_{TX,I}$.

The data processing unit 9 may be adapted to output the signal $S_{TX}$ being coded such that the bits are encoded or scrambled to yield a signal $S_{TX}$ with a constant average power.

While in the above-explained embodiment the high bit-rate signal is created according to an external signal (this may be a wanted signal carrying information or a signal carrying no information to be transmitted, e.g. an idle signal) supplied to the transmitting device 5, the data processing unit 9 may create the high bit-rate signal independently from an external signal. In this case, the high bit-rate signal merely serves as a carrier signal in order to transport the information according to the low-frequency signal. In this way, for example, a desired switching process may be effected at the location at which the low-frequency component of the signal is detected and evaluated.

The high bit-rate digital signal $S_{TX}$ is supplied to a modulation unit 11 adapted to effect a density modulation of the signal $S_{TX}$ according to a low-frequency modulation signal $S_{mod}$ also supplied to the modulation unit 11. The density modulation results in a variation or modulation of the density of "high" bits and thus in a variation or modulation of the average power of a modulated signal $S_{TX,mod}$ that is output by the modulation unit 11. The density modulation may be effected according to one of the embodiments explained below. However, the invention is not restricted to the use of one of the specific methods described in the following.

Of course, the modulation unit 11 may be integrally formed with the data processing unit 9 so that all functions of the modulation unit are realized within the data processing unit 9. This may especially be advantageous if the modulated high bit-rate digital signal is created on the basis of more than one local digital signal $S_{TX,I}$ as the step of generating a high bit-rate stream including the information of the local digital signals can be effected simultaneously with the specific encoding process for including the information of the low-frequency signal in the variation of the average power of the modulated high bit-rate digital signal. In such cases, the bit stream according to the high bit-rate digital signal $S_{TX}$ described above does not physically exist.

Generally, the data processing unit 9 and the modulation unit 11 (as well as a combined data processing and modulation unit 10) may be realized by a microprocessor circuit, the coding ability essentially being controlled by a suitable software or firmware.

As the high bit-rate digital signal $S_{TX}$ generally (but not necessarily) includes the information carried by the at least one digital signal $S_{TX}$, the high bit-rate digital signal $S_{TX}$ is (in general) a wanted signal. Density modulating this wanted signal makes it possible to transport further information, like the information of a control channel included in the low-frequency signal, within the same optical channel occupied by the signal $O_{TX,mod}$.

The modulated signal $S_{TX,mod}$, which is still an electrical signal, is transformed into an optical modulated high bit-rate digital signal $O_{TX,mod}$ by an electrical-to-optical conversion means 13, for example a laser module, and supplied to the respective end of the transmission link 1 which is connected to the transmitting device 5.

The other end of the transmission link 1 is connected to an input port of the receiving device 7. The optical signal received $O_{RX,mod}$ is supplied to an optical-to-electrical conversion means 15, for example an optical receiving module comprising a photo diode, which outputs an electrical received modulated high bit-rate digital signal $S_{RX,mod}$. The signal received $S_{RX,mod}$ is on the one hand supplied to a data processing unit 17 which may be adapted to decode the signal $S_{RX,mod}$ so that the signal $S_{RX}$ output at the output port 7a of the receiving unit 7 is identical with the unmodulated signal $S_{TX}$ (but may still be encoded so as to reveal an essentially constant average power). Of course, the data processing unit 17 may further process the signal received $S_{RX,mod}$ so that the signal output equals the at least one signal $S_{TX,I}$. If more than one local signal $S_{TX,I}$ is included in the signal $S_{TX,mod}$ (and thus also in the signal $S_{RX,mod}$) the data processing unit 17 may include a corresponding number of output ports to each of which a respective local signal is supplied.

On the other hand, the signal received $S_{RX,mod}$ is supplied to a low-pass filter device 19 which outputs a low-pass filtered signal $S_{tone}$ corresponding to the low-frequency signal $S_{mod}$.

At this point, it shall be mentioned that the low-frequency signal $S_{mod}$ may be an analog or digital signal. The density modulation method used in order to include the information carried by the low-frequency signal $S_{mod}$ allows to switch between two or more states, wherein even two states can be sufficient to modulate the signal $S_{TX}$ such that the average power follows the shape of the modulating low-frequency signal with sufficient accuracy if a back and forth switching between the two states is effected faster than the highest frequency component of the signal $S_{mod}$. This will become apparent from the explanations below.

FIG. 2 shows the characteristic of a laser module that might be used as electrical-to-optical conversion means 13 according to FIG. 1. The incoming modulated signal $S_{TX,mod}$ is used to correspondingly vary the laser current $I_L$. As the laser module reveals an essentially linear $P_L/I_L$ characteristic, the optical output signal $O_{TX,mod}$ follows the shape of the input signal. Low-pass filtering the signal $S_{RX,mod}$ detected by the receiving device 7 produces a signal $S_{tone}$ the shape of which essentially corresponds to the shape of the modulating signal $S_{mod}$.

The cut-off frequency of the low-pass filter device must be chosen to be higher than the highest (significant) frequency component of the low-frequency (modulation) signal $S_{mod}$.

Using the method of data density modulation to impress a tone onto the optical carrier (i.e. to modulate the high bit-rate digital signals $S_{TX}$ according to the low-frequency signal $S_{mod}$) allows the use of a standard transceiver. No additional hardware is necessary in order to effect the modulation. While on the transmit side access to the data is required, the detection of the low-frequency signal at the receive side can be performed by a low-bandwidth receiver comprising (or even merely consisting of) a low-pass filter device. Neither access to the transmitter bias current (e.g. of a laser module), nor a high-cost optical modulator is required.

The general principle of the modulation technique according to the invention is to modify the distribution of "high" bits and "low" bits in the data stream of the signal $S_{TX}$ in order to vary the average signal power over time.

This can, for example, be achieved by wrapping the data into an outer frame, in which additional data are added to increase the imbalance between "high" and "low" bits. However, this would mean to add a significant amount of overhead which is usually unacceptable.

A first preferred embodiment of a modulation scheme which does not introduce any overhead if an 8B/10B coding is used within the signal $S_{TX}$ shall now be explained:

For several transmission protocols, the standardized 8B/10B coding is employed, where an 8-bit data word is encoded into a 10-bit transmission word, which has a minimum average power of 0.45 and a maximum average power of 0.55 (both relative to the peak signal power). The power deviation from the ideal average of 0.5 of a single 10-bit transmission word is equalized by encoding the following 8-bit data word in the proper 10-bit transmission word, resulting in a maximum "running disparity" of +/−1. That is, the standardized 8B/10B coding generally produces a coded signal revealing a constant average power.

In principle, any type of nB/mB coding may be employed, where an n-bit data word is encoded into an m-bit transmission word with a corresponding effect.

Here, this coding method may be modified to intentionally create a deviation of the constant average power by switching between predetermined coding tables (the standardized RD+ and RD− table of the 8B/10B coding).

In a preferred setup, the received data stream of the signal $S_{TX,I}$, if this signal is already 8b/10b encoded, is decoded in the data processing unit 9. Then, the modulation unit 11 applies a modified 8b/10b encoding, wherein the 10b-code word is selected based on the target average power of the optical signal. For instance, if the target power is at 0.55, all 10b-words are taken from the negative running disparity (RD−) table, whereas, if the target power is at 0.45, the 10b-code words are taken from the RD+ table. If a periodic tone pattern of the low-frequency signal $S_{mod}$ is to be impressed, encoding is performed using the RD− table for half of the pattern period and from the RD+ table for the other half.

A simulated example of a low-pass filtered signal $S_{RX,mod}$ having an essentially rectangular periodic shape is shown in FIG. 3. Here, a 1.25 Gb/s signal was created using an 8B/10B coding of a Gigabit Ethernet (GbE) signal, the modulating signal $S_{mod}$ being a rectangular periodic signal having a period of 250 kHz. The modulation amplitude was controlled to be ±10 percent by using the RD− table for the first half of the period of the periodic rectangular low-frequency signal and using the RD+ table for the second half. The low-pass filtering was effected using a cut-off frequency of 1 MHz. FIG. 3 demon-states that this simple-to-implement density modulation method is sufficient to transmit a low-frequency modulation signal by using a wanted high bit-rate digital signal. It is to be noted that the diagram according to FIG. 3 uses relative units in both axes, where the X-axis represents the time and the Y-axis represents the (relative) signal power.

FIG. 4 shows a diagram similar to FIG. 3. In this example, a periodic low-frequency sawtooth signal was used as modulating signal $S_{mod}$. The bit-rate of the high bit-rate digital signal $S_{TX,mod}$ as well as the periodicity of the modulating signal $S_{mod}$ remained the same. Low-pass filtering was again effected at a cut-off frequency of 1 MHz. The sawtooth signal was sampled in 10 intervals (using a 2.5 MHz sampling frequency). In each interval, encoding was effected using the RD+ table if the corresponding sample value of the sawtooth signal was negative or using the RD− table if the sample value was positive until the desired variation of the average power in the modulated signal $S_{TX,mod}$ was reached. Once this power variation was reached the standard 8B/10B coding (yielding an average relative power of 0.5) had been used until the end of the respective sampling interval.

In other words, average values between 0.45 and 0.55 can be achieved if frames of several (e.g. 100) words are defined, in which a fraction of these frames are encoded using fixed (RD− or RD+) tables, while the remaining fractions of the frames are encoded using the standard 8b/10b encoding process. Using this method, nearly arbitrary tone shapes can be impressed on the high bit-rate digital signal, for instance a sinusoidal tone, that is, not only rectangular or digital low-frequency signals $S_{mod}$ may be used in order to transmit the desired information by means of the wanted high bit-rate digital signal, but also (quasi) analog low-frequency signals.

At the receiving device 7, the 8B/10B encoded words can be decoded using a standard 8B/10B decoder. During the decoding process, disparity errors will occur, but the correct decoding function will be performed.

In an extension of this method, during 8B/10B coding the concept can be used separately for the 3B/4B coding part and the 5B/6B coding part. This will enable a variation of the average power between 0.41 and 0.59 and improves the achievable modulation index from 10% to 18%.

A further preferred method for encoding the signal $S_{TX}$ according to the low-frequency signal $S_{mod}$ will now be described with reference to FIG. 5.

Here, the modulating device 11 divides the stream of the signal $S_{TX}$, which may already reveal an 8B/10B encoding or any other suitable encoding, into n-bit words, e.g. 4-bit words according to the example in FIG. 5. To each of the n-bit words an overhead of one flag bit is added.

If an increase in the density of "high" bits is desired (according to a corresponding (sample) value of a (normalized) low-frequency signal), the flag bit is set to "high" (or "1" in the table of FIG. 5) and the 4-bit words (or, in general, n-bit words) are inverted (bit-wise inversion) if the number of "high" bits is less or equal to the number of "low" bits ("0" in the table of FIG. 5). Otherwise, the flag bit is set to "low" and the 4-bit words remain unchanged.

Alternatively, if a decrease in the density of "high" bits is desired (according to a corresponding (sample) value of a (normalized) low-frequency signal), the flag bit can be set to "low" and the 4-bit words (or, in general, n-bit words) can be inverted (bit-wise inversion) if the number of "high" bits is greater than or equal to the number of "low" bits. Otherwise, the flag bit is set to "high" and the 4-bit words remain unchanged.

It is possible, in both above-mentioned alternatives, to invert the method for setting the flag bit. However, the method described grants the optimum maximum modulation depth.

Instead of just increasing or just decreasing the density of "high" bits as described above, it is possible to combine both alternatives. In this alternative, if an increase in the density of "high" bits is desired, the flag bit is set to "high" and the 4-bit words (or, in general, n-bit words) are inverted if the number of "high" bits is less than or equal to the number of "low" bits, and, if a decrease in the density of "high" bits is desired, the flag bit is set to "high" and the 4-bit words (or, in general, n-bit words) are inverted (bit-wise inversion) if the number of "high" bits is greater than the number of "low" bits. If no inversion is done, the flag bit is set to "low".

This method (all three of the alternatives described above) adds an overhead of 25% to the signal to be encoded if a segmentation in 4-bit words is used. Of course, the amount of overhead added decreases with the number n bits included within the n-bit words. At the same time, the maximum modulation depth decreases.

Values between the maximum modulation depth are again achievable by using any of the above-mentioned alternatives for a portion of the sample intervals and maintaining the bit stream unchanged in the remaining portion (i.e. maintaining this portion almost unchanged, apart from adding the flag bit, which might in this case be set to alternating values in order to essentially maintain the average power of the signal in this remaining part of the sample interval; further, in this case synchronization words may be inserted into the bit stream indicating the begin or end of the changed or unchanged portions, each of which may consist of more than one section).

LIST OF REFERENCE SIGNS

1 transmission link
3 fiber-optic waveguide
5 transmitting device
7 receiving device
7a output port
9 data processing unit
10 data processing and modulation unit
11 modulation unit
13 electrical-to-optical conversion means, laser module
15 optical-to-electrical conversion means
17 data processing unit
19 low-pass filter device $S_{TX,I}$ local digital signal to be transmitted
$S_{TX}$ electrical high bit-rate digital signal
$S_{mod}$ electrical low-frequency (modulating) signal
$S_{TX,mod}$ electrical modulated high bit-rate digital signal
$O_{TX,mod}$ optical modulated high bit-rate digital signal
$O_{RX,mod}$ received optical modulated high bit-rate digital signal
$S_{RX}$ received electrical decoded high bit-rate digital signal
$S_{RX,mod}$ received optical modulated high bit-rate digital signal
$S_{tone}$ demodulated electrical low-frequency signal

The invention claimed is:

1. A method for transmitting a modulating frequency signal over a data transmission link using a processed digital signal, the method comprising the steps of:
   (a) creating a modulated processed digital signal, an average power of which varies according to the modulating frequency signal,
   (b) supplying the modulated processed digital signal to a first end of the data transmission link,
   (c) receiving the modulated processed digital signal at a second end of the data transmission link or at an intermediate node of the data transmission link, and
   (d) detecting the modulating frequency signal by low-pass filtering the received modulated processed digital signal,
   wherein
   (e) the variation of the average power of the modulated processed digital signal is effected by a variation of the density of bits according to the modulating frequency signal.

2. The method according to claim 1, wherein the transmission link is an optical transmission link and that the modulated processed digital signal supplied to the first end of the transmission link is an optical signal.

3. The method according to claim 1, wherein the modulated processed digital signal is created by modulating the average power of a processed digital signal according to the modulating frequency signal, with the processed digital signal revealing an essentially constant average power.

4. The method according to claim 1, wherein the density variation is effected by inserting, according to a predetermined pattern, additional bits into the processed digital signal in order to increase or decrease its average power, preferably by wrapping the data of the processed digital signal into outer frames, in which the additional bits are added.

5. The method according to claim 1, wherein the density variation of bits within the modulated processed digital signal is effected by applying a varying encoding rule for directly creating the modulated processed digital signal or by applying a varying modulating encoding rule to the processed digital signal to be modulated according to the modulating frequency signal.

6. The method according to claim 5, wherein the encoding rule or the further modulating encoding rule uses an nB/mB encoding method, which maps digital words having n bits to digital words having m bits, wherein m and n are integer numbers with m greater than n, and wherein the m-bit words are chosen such that the density of bits of the concatenated m-bit words, which form the modulated processed digital signal, yields an average power of the modulated processed digital signal corresponding to the modulating frequency signal.

7. The method according to claim 1, wherein the modulated processed digital signal is created by further encoding a processed digital signal, the further encoding including the step of:

(f) dividing the processed digital signal into concatenated p-bit words and inverting the single bits of the p-bit words if the number of bits that do not transport any power that contribute to an increase of the average power of the signal is greater than or equal to the number of bits that contribute to an increase of the average power of the signal, only, and by adding an overhead bit to the p-bit words so as to form the modulated processed digital signal consisting of concatenated (p+1)-bit words revealing, as compared to the original processed digital signal and corresponding to the modulating frequency signal, an increased average power, and by setting the overhead bit in the (p+1)-bit words to indicate if no inversion was effected or if inversion was effected.

8. The method according to claim 7, wherein (i) a varying encoding rule or a varying modulating encoding rule to include two states between which switching is effected in order to modulate the processed digital signal, the first state being assigned a maximum value and a second state being assigned to a minimum value of the modulating frequency signal, (j) a first one of the two states defining the maximum increase and a second one of the two states defining the minimum increase of the density of bits within the modulated processed digital signal as compared to the original processed digital signal, or (k) a first one of the two states defining the maximum decrease and a second one of the two states defining the minimum decrease of the density of bits within the modulated processed digital signal as compared to the original processed digital signal, or (l) a first one of the two states defining the maximum increase and a second one of the two states defining the maximum decrease of the density of bits within the modulated processed digital signal as compared to the original processed digital signal.

9. The method according to claim 8, wherein intermediate values of the modulating frequency signal are realized in the modulated processed digital signal by switching between the first and second state in order to generate an average density of bits corresponding to the respective instantaneous intermediate value.

10. The method according to claim 1, wherein the modulated processed digital signal is created by further encoding a processed digital signal, the further encoding including the steps of:

dividing the processed digital signal into concatenated p-bit words and inverting single bits of the p-bit words if the number of bits that contribute to an increase of the average power of the signal is greater or equal to the number of bits that do not transport any power that contribute to an increase of the average power of the signal, only, and by adding an overhead bit to the p-bit words so as to form a modulated processed digital signal consisting of concatenated (p+1)-bit words revealing, as compared to the original processed digital signal and corresponding to the modulating frequency signal, a decreased average power and by setting the overhead bit in the (p+1)-bit words to indicate if inversion was effected or if no inversion was effected.

11. The method according to claim 1, wherein the modulated processed digital signal is created by further encoding a processed digital signal, the further encoding including the steps of:

dividing the processed digital signal into concatenated p-bit words and either inverting the single bits of the p-bit words if the number of bits that do not transport any power that contribute to an increase of the average power is greater than or equal to the number of bits that contribute to an increase of the average power of the signal and if, according to the modulating frequency signal, an increased density of bits that contribute to an increase of the average power of the signal is requested, increasing inversion, and inverting the single bits of the p-bit word if the number of bits that contribute to an increase of the average power is greater than the number of bits that do not transport any power that contribute to an increase of the average power, and if, according to the modulating frequency signal, a decreased density of bits that contribute to an increase of the average power of the signal is requested, decreasing inversion, and by adding an overhead bit to the p-bit words so as to form a modulated processed digital signal consisting of concatenated (p+1)-bit words revealing, as compared to the original processed digital signal and corresponding to the modulating frequency signal, an increased or decreased average power, and by setting the overhead bit in the (p+1)-bit words to indicate if an inversion was effected or if no decreasing inversion was effected.

12. A transmitting device for transmitting a modulating frequency signal over a data transmission link using a processed digital signal, the transmitting device comprising a data processing and modulation unit which includes:

(a) a data processing unit adapted (i) to receive at least one digital signal to be transmitted over the data transmission link and to create a processed digital signal, or (ii) to directly receive a processed digital signal, or (iii) to create a processed digital signal independently of any external signal; and (b) a modulation unit adapted (i) to receive the processed digital signal and a modulating frequency signal including information to be transmitted over the data transmission link, and (ii) to create a modulated processed digital signal which includes the information of the modulating frequency signal in a variation of the average power of the modulated processed digital signal, wherein the variation of the average power of the modulated processed digital signal is effected by varying the density of bits according to the modulating frequency signal.

13. The transmitting device according to claim 12, wherein the transmitting device comprises an optical transmitter unit adapted to receive the modulated processed digital signal and to convert the modulated processed digital signal into an optical signal which is output at an output port.

14. The transmitting device according to claim 12, wherein the device is adapted to effect the modulation of a processed digital signal according to a method comprising the steps of:

creating a modulated processed digital signal average power of which varies according to the modulating frequency signal; and supplying the modulated processed digital signal to a first end of the data transmission link, wherein the density variation is effected by inserting, according to a predetermined pattern, additional bits into a processed digital signal in order to increase or decrease its average power, preferably by wrapping the data of the processed digital signal into outer frames, in which the additional bits are added.

15. A receiving device adapted to receive the modulated processed digital signal as generated by the transmitting device according to claim 12, comprising:
(a) a receiver unit adapted to receive the modulated processed digital signal and to output the received modulated processed digital signal, and
(b) a low-pass filter device adapted to receive the received modulated processed digital signal and to low-pass filter this signal, the cut-off frequency of the low-pass filter device being above the highest frequency of the modulating frequency signal to be detected, and to output the low-pass filtered signal as a received modulating frequency signal.

16. The receiving device according to claim 15, wherein the modulated processed digital signal is an optical modulated processed digital signal and wherein the receiver unit comprises an optical-to-electrical converting means adapted to receive the optical modulated processed digital signal and to output a corresponding electrical modulated processed digital signal.

* * * * *